United States Patent
Hamilton et al.

(10) Patent No.: US 10,949,732 B2
(45) Date of Patent: Mar. 16, 2021

(54) BALE IDENTIFICATION ASSEMBLY FOR BINDING AN IDENTIFICATION TAG TO A BALE OF AGRICULTURAL CROP MATERIAL

(71) Applicant: AGCO Corporation, Duluth, GA (US)

(72) Inventors: Kevin J. Hamilton, Newton, KS (US); Emmanuel Regis Magisson, Hesston, KS (US); Daniel Soldan, Hillsboro, KS (US); Grant Lewis Good, Moundridge, KS (US); Robert L. Figger, Hesston, KS (US); Shane A. Bollinger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/492,260

(22) PCT Filed: Mar. 5, 2018

(86) PCT No.: PCT/US2018/020837
§ 371 (c)(1),
(2) Date: Sep. 9, 2019

(87) PCT Pub. No.: WO2018/164981
PCT Pub. Date: Sep. 13, 2018

(65) Prior Publication Data
US 2020/0375116 A1 Dec. 3, 2020

Related U.S. Application Data

(60) Provisional application No. 62/468,817, filed on Mar. 8, 2017.

(51) Int. Cl.
*A01F 15/08* (2006.01)
*G06K 19/077* (2006.01)
(Continued)

(52) U.S. Cl.
CPC ...... *G06K 19/07773* (2013.01); *A01F 15/042* (2013.01); *A01F 15/08* (2013.01);
(Continued)

(58) Field of Classification Search
CPC .... A01F 15/08; A01F 15/0825; A01F 15/042; A01F 15/145; A01F 15/148;
(Continued)

(56) References Cited

U.S. PATENT DOCUMENTS 6,329,917 B1 12/2001 Leonard
6,478,229 B1 11/2002 Epstein
(Continued)

FOREIGN PATENT DOCUMENTS

| EP | 1 842 417 A1 | 10/2007 |
|---|---|---|
| EP | 3 270 368 A2 | 1/2018 |
| WO | 2012/152677 A1 | 11/2012 |

OTHER PUBLICATIONS

European Patent Office, International Search Report for related International Application No. PCT/US2018/020837, dated May 30, 2018.
(Continued)

*Primary Examiner* — Jimmy T Nguyen

(57) ABSTRACT

A bale identification assembly includes binding material used by a knotter system to bind a formed bale, the binding material including identification tags at spaced intervals along the binding material. A read module transmits interrogator signals and also receives authentication replies from the identification tags. A position sensor is used to predict passage of identification tags through the knotter mechanism and a bale length sensor provides a signal representing bale length. A controller receives signals from the bale length sensor and the position sensor and generates a signal to alter the length of the bale by causing an additional flake to be
(Continued)

added to the bale by the plunger or the bale to be finished with fewer flakes to prevent the knotter system from tying a knot in the binding material such that the identification tag is positioned in a portion of the binding material used to form the knot.

6 Claims, 4 Drawing Sheets

(51) Int. Cl.
    *G06K 7/10*     (2006.01)
    *D07B 1/14*     (2006.01)
    *A01F 15/04*     (2006.01)
    *A01F 15/14*     (2006.01)
    *G01B 5/04*     (2006.01)
    *G06K 19/07*     (2006.01)
    *A01F 15/07*     (2006.01)

(52) U.S. Cl.
    CPC ........ *A01F 15/0825* (2013.01); *A01F 15/148* (2013.01); *D07B 1/147* (2013.01); *G01B 5/043* (2013.01); *G06K 7/10425* (2013.01); *G06K 19/0723* (2013.01); *A01F 15/145* (2013.01); *A01F 2015/076* (2013.01); *D07B 2501/2038* (2013.01)

(58) Field of Classification Search
    CPC ........ A01F 2015/076; G06K 19/07773; G06K 19/0723; G06K 7/10425; G01B 5/043; A61K 39/3955; A61K 45/06; A61K 2039/505; A61K 2039/507; D07B 1/147; D07B 2015/2038
    See application file for complete search history.

(56) References Cited

U.S. PATENT DOCUMENTS

| | | | |
|---|---|---|---|
| 6,917,291 B2 | 7/2005 | Allen | |
| 7,035,877 B2 | 4/2006 | Markham | |
| 7,415,924 B2 | 8/2008 | Roberts | |
| 7,703,391 B2 | 4/2010 | Duenwald et al. | |
| 7,717,149 B2 | 5/2010 | Johnson | |
| 8,516,954 B2 | 8/2013 | Smith et al. | |
| 9,803,316 B2 | 10/2017 | Lauer | |
| 9,943,036 B2 | 4/2018 | Verhaeghe et al. | |
| 2002/0134834 A1 | 9/2002 | Otto | |
| 2002/0196150 A1 | 12/2002 | Wildman | |
| 2003/0112155 A1 | 6/2003 | Landre | |
| 2007/0185612 A1 | 8/2007 | Stevens et al. | |
| 2007/0240389 A1* | 10/2007 | Frerichs | A01F 15/0715 53/587 |
| 2009/0025578 A1 | 1/2009 | Roberts | |
| 2009/0056880 A1 | 3/2009 | Johnson | |
| 2009/0107349 A1* | 4/2009 | Noonan | A01F 15/071 100/14 |
| 2009/0108606 A1 | 4/2009 | Noonan et al. | |
| 2012/0048129 A1* | 3/2012 | Smith | A01F 15/101 100/2 |
| 2013/0066897 A1 | 3/2013 | Ehrenberg | |
| 2013/0160661 A1 | 6/2013 | Duenwald et al. | |
| 2014/0157999 A1* | 6/2014 | Verhaeghe | B65C 3/02 100/3 |
| 2015/0310323 A1 | 10/2015 | Foster et al. | |
| 2016/0029565 A1 | 2/2016 | Coen et al. | |
| 2017/0287303 A1 | 10/2017 | Lang et al. | |
| 2017/0354092 A1 | 12/2017 | Lang et al. | |
| 2018/0014467 A1 | 1/2018 | Lang et al. | |

OTHER PUBLICATIONS

European Patent Office, International Search Report for related International Application No. PCT/IB2019/054227, dated Oct. 7, 2019.

European Patent Office, International Search Report for related International Application No. PCT/US2018/020833, dated May 30, 2018.

* cited by examiner

BALE IDENTIFICATION ASSEMBLY FOR BINDING AN IDENTIFICATION TAG TO A BALE OF AGRICULTURAL CROP MATERIAL

CROSS REFERENCE TO RELATED APPLICATION

This application claims the benefit of U.S. Provisional Application No. 62/468,817 filed Mar. 8, 2017, which is hereby incorporated by reference in their entirety.

BACKGROUND OF THE INVENTION

Field of Invention

The present disclosure is generally related to agricultural balers and, more particularly to a method and assembly for supplying bale identification tags 62 to bales of agricultural crop material.

Description of Related Art

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler travels along the windrow to picks up the crop material and forms it into bales. Pickups of the baler gather the cut and windrowed crop material from the ground then convey the cut crop material into a bale-forming chamber within the baler. A drive mechanism operates to activate the pickups, augers, and a rotor of the feed mechanism.

In conventional square balers include a bale forming chamber and a reciprocating plunger that slides into and out of the chamber. As the chamber receives loose hay material, the plunger slides into the chamber during a compaction stroke to compress the loose hay material into the form of a bale. A conventional round baler includes a bale forming chamber with a pair of opposing sidewalls with a series of belts, chains, and/or rolls that rotate and compress the crop material into a cylindrical shaped bale.

When the bale has achieved a desired size and density, a wrapping system may wrap the bale to ensure that the bale maintains its shape and density. For example, a twine wrapping apparatus may be provided to wrap the bale of crop material while still inside the bale forming chamber. A cutting or severing mechanism may be used to cut the twine once the bale has been wrapped. The wrapped bale may be ejected from the baler and onto the ground.

The ability to trace or track parameters of each bale may be useful to an end user. Baled products, such as hay or silage, may be fed to livestock, and the quality of the feed may be important to the diet of the livestock. For example, a higher quality feed may be fed to certain livestock, whereas feed with lesser quality may go to a different type of livestock. It may be desirable to trace where food products come from, what the livestock ate while it was being raised, etc. It is also desirable to be able to label each bale with other important properties, such as moisture content and nutritional value. Other potential parameters of interest include but are not limited to GPS Location when bale is tied, where the bale leaves the baler, farm name, farmer id, field name, preservative type, amount of preservative applied, etc. As a result, bale identification systems may be employed in the baling process for storing or otherwise retaining the parameters or quality of the crop so it can be provided to the end user. To identify a bale, it is known to attach a tag containing information such as the size, weight, and date of the bale. To identify a bale, it is known to attach a tag containing the information. However, improvements in the manner identification tags used to identify are affixed to a bale is desired.

BRIEF SUMMARY OF THE INVENTION

Briefly stated, one aspect of the invention is directed to a bale identification assembly for use with an agricultural baler used to take loose crop material from the ground into bales and compress a formed bale in a baling chamber with a reciprocating plunger. The baler has at least one crop sensor and/or bale sensor configured to sense a parameter of the crop material or formed bale, a knotter system that uses a binding material to bind the formed bale and tie a knot in the binding material, and a discharge chute at the rear end of the bale-forming chamber through which a completed bale is discharged. The bale identification assembly includes a binding material used by the knotter system to bind the formed bale, the binding material comprising identification tags at spaced intervals along the binding material. The bale identification assembly includes a read module with one or more antennas configured to transmit interrogator signals and also receives authentication replies from identification tags. The bale identification assembly includes a position sensor configured to predict the passage of identification tags through the knotter mechanism and a bale length sensor providing a signal representing bale length, with a control signal being sent to initiate the tying cycle when the forming bale reaches a length corresponding to a desired bale length. The bale identification assembly includes a controller configured to receive signals from the bale length sensor and the position sensor and to generate a signal to alter the length of the bale by causing an additional flake to be added to the bale by the plunger or the bale to be finished with fewer flakes to prevent the knotter system from tying a knot in the binding material such that the identification tag is positioned in a portion of the binding material used to form the knot.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF PREFERRED EMBODIMENTS

Figure 1:
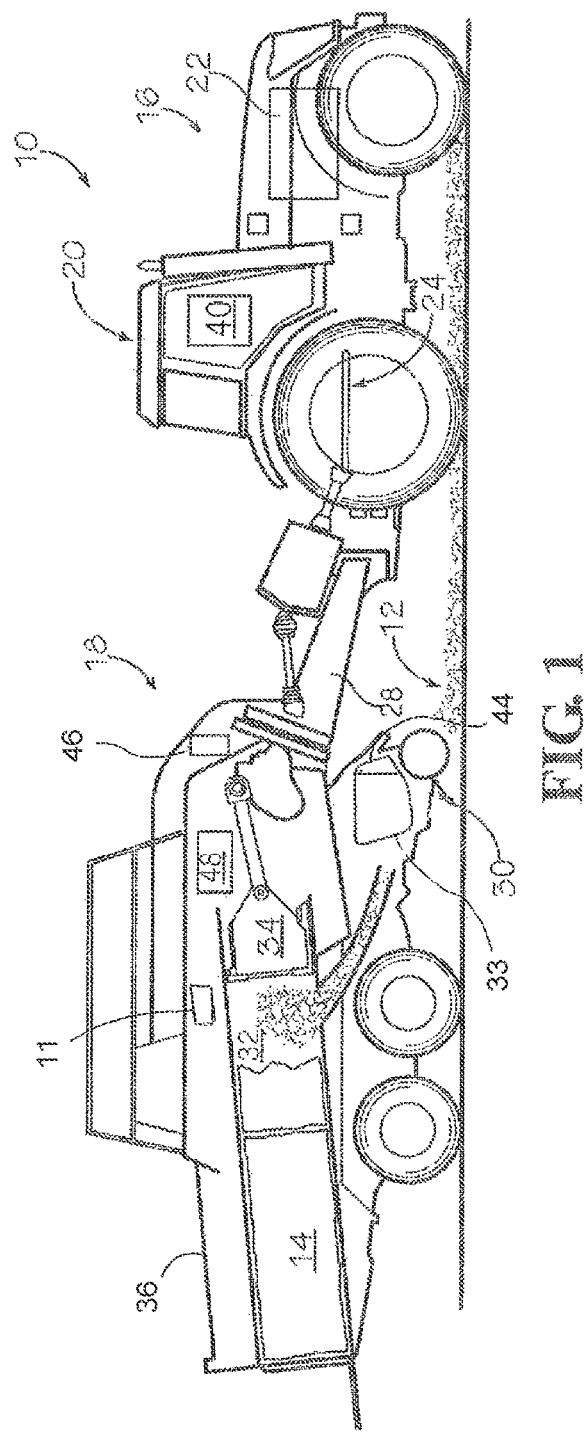
FIG. 1 is a semi-schematic diagram of an baler.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Referring now to FIG. 1, shown is a semi-schematic diagram of an agricultural baler system 10 in which certain embodiments of a bale identification assembly 11 may be employed while baling loose crop material 12 from the ground into bales 14. The baler system 10 includes a towing vehicle 16 and a baler 18. The towing vehicle 16 may include a cab 20 wherein an operator is located; an engine 22 operable to move the towing vehicle 16; and a power take-off (PTO) 24 operable to transfer mechanical power from the engine 22 to the baler 18. The baler 18 is hitched to the towing vehicle 16 by a fore-and-aft tongue 28, and power for operating the various mechanisms of the baler 18 may be supplied by the PTO 24 of the towing vehicle 16, though not limited as such. One having ordinary skill in the art should appreciate in the context of the present disclosure that the example baler 18 is merely illustrative, and that other types of baling devices that utilize bale identification assemblies may be implemented.

The baler 18 has a fore-and-aft extending baling chamber denoted generally by the numeral 32 within which bales 14 of crop material 12 are prepared. The baler 18 is depicted as an "in-line" type of baler wherein crop material 12 is picked up below and slightly ahead of baling chamber 32 and then loaded up into the bottom of chamber 32 in a straight line path of travel. A pickup assembly broadly denoted by the numeral 30 is positioned under the tongue 28 on the longitudinal axis of the machine, somewhat forwardly of the baling chamber 32. A stuffer chute assembly 33 is generally shown, and includes a charge forming stuffer chamber that in one embodiment is curvilinear in shape. In some embodiments, the stuffer chamber may comprise a straight duct configuration, among other geometries. For instance, the stuffer chute assembly 33 extends generally rearward and upwardly from an inlet opening just behind the pickup assembly 30 to an outlet opening at the bottom of the baling chamber 32. In the particular illustrated embodiment, the baler 18 is an "extrusion" type baler in which the bale discharge orifice at the rear of the baler is generally smaller than upstream portions of the chamber such that the orifice restricts the freedom of movement of a previous charge and provides back pressure against which a reciprocating plunger 34 within the baling chamber 32 can act to compress charges of crop materials into the next bale. The dimensions of the discharge orifice and the squeeze pressure on the bales at the orifice are controlled by a compression mechanism as would be understood by one skilled in the art.

The plunger 34, as is known, reciprocates within the baling chamber 32 in compression and retraction strokes across the opening at the bottom of the baling chamber 32. In the portion of the plunger stroke forward of the opening, the plunger 34 uncovers the duct outlet opening, and in the rear portion of the stroke, the plunger 34 completely covers and closes off the outlet opening. The reciprocating plunger 34 presses newly introduced charges of crop material against a previously formed and tied bale 14 to thereby form a new bale. This action also causes both bales to intermittently advance toward a rear discharge opening 14 of the baler. The completed bales 14 are tied with binding material or a similar twine. Once tied, the bales are discharged from the rear end of the bale-forming chamber 32 onto a discharge in the form of a chute, generally designated 36.

The baler 18 (or towing vehicle 16) includes a communication bus 40 extending between the towing vehicle 16 and the baler 18. The baler has one or more crop sensors 44; one or more bale sensors 46; and may include one or more computing devices such as electronic control unit (ECU) 48. Various alternative locations for ECU 48 may be utilized, including locations on the towing vehicle 16. It will be understood that one or more ECUs 48 may be employed and that ECU 48 may be mounted at various locations on the towing vehicle 16, baler 18, or elsewhere. ECU 48 may be a hardware, software, or hardware and software computing device, and may be configured to execute various computational and control functionality with respect to baler 18 (or towing vehicle 16). As such, ECU 48 may be in electronic or other communication with various components and devices of baler 18 (or towing vehicle 16). For example, the ECU 48 may be in electronic communication with various actuators, sensors, and other devices within (or outside of) baler 18. ECU 48 may communicate with various other components (including other controllers) in various known ways, including wirelessly.

As the baled crop 12 is formed in the baler 18, certain parameters or qualities of the crop 12 or bale 14 may be measured or determined by the crop sensors 44 and/or bale sensors 46, e.g., moisture quality, baling time, bale weight, bale length, etc. In the baling chamber 32, for example, a moisture sensor can measure an electrical resistance or capacitance of the bale for detecting its moisture content. Another sensor can measure the length of the bale. Each characteristic or parameter that is measured may be done so by one or more sensors 44, 46. Each measurement may be communicated to the ECU 48 for recording. The ECU 48 may communicate the detected measurement to a data server or other database for storage. The measurements may be stored locally via the data server or wirelessly communicated via a mobile device to a remote location over the cloud-based technology.

Figure 2:
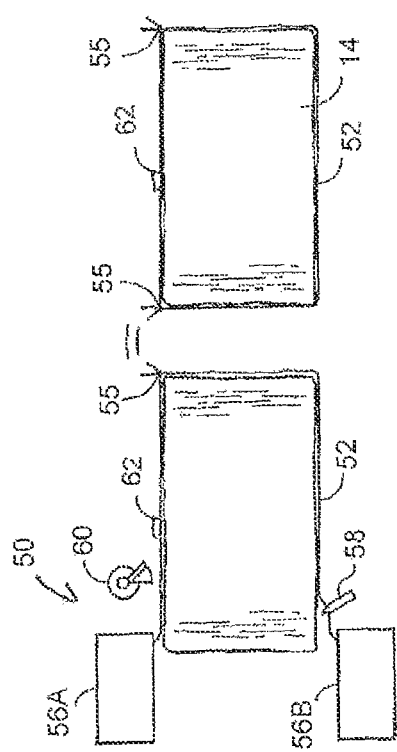
FIG. 2 is a schematic diagram of a first bale being bound with a binding material having a bale identification tag and a second bale bound with the binding material.
Figure 3:
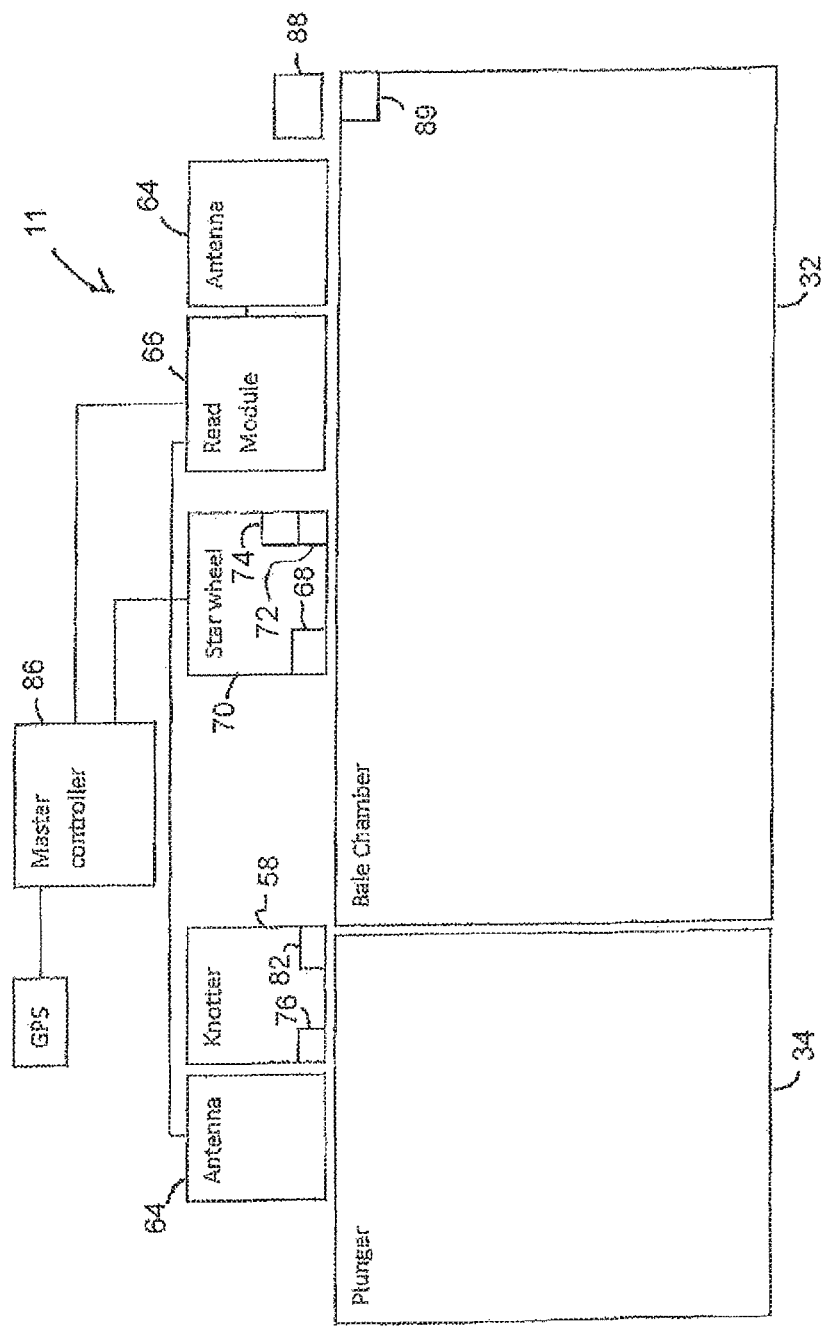
FIG. 3 is a schematic drawing of a bale identification assembly used with the baler of FIG. 1.

Turning now to FIGS. 2 and 3, a knotter system 50 is configured to loop a binding material 52 around the finished bale 14. The term "binding material" as used herein is intended to mean not only twine made from natural or synthetic fibers, but may also include metallic wire or other strapping material. The knotter system 50 guides the binding material 52 around the bale 14 and forms a closed loop in the binding material encircling the bale 14, for example by forming a knot 55. The knotter system 50 may be implemented as known in the art, and may for example comprise at least one source of binding material, e.g. at least one binding material supply roll 56, and a knotter mechanism 58, for example implemented as a reciprocating inserter arm or bill hook, for bringing another piece, e.g. end, of the binding material towards the end held by the hook mechanism, for securing the binding material to itself so as to make a loop and a cutter 60 for cutting the binding material. In one embodiment known as a single a single knotter, a single supply roll may be provided at the top side of the knotter system 50. In alternative embodiments, for example in case of a double knotter as illustrated in FIG. 2, an upper supply roll 56A and lower supply roll 56B may be provided at the top and at the bottom side of the knotter system 50. For illustration purposes only, two bales 14, one already packed and one being packed, are illustrated in FIG. 2 with a spacing there between. In reality, both bales 14 will push one against the other, so the spacing will not be present. The binding material 52 is pulled between both bales 34. As knotter systems 50 are well known in the art, further description of the knotter system need not be included herein.

According to the invention, the bale identification assembly 11 is provided to use electromagnetic fields for assigning attributes of the bale 14 to a bale identification tag 62 applied to the bale 14. Desirably, the bale identification tag 62 is a passive radio-frequency identification (RFID) tag used to electronically store information and collect energy from a nearby RFID reader's interrogating radio waves. As RFID tags are known to those skilled in the art, a detailed description of the RFID tag need not be provided herein. In embodiments of the present invention, the binding material is provided with bale identification tags 62. Bale identification tags 62 are placed in the binding material 52 at certain intervals.

As seen in FIG. 3, the bale identification assembly 11 includes a read module 66 and one or more antennas 64 such as an Active Reader Passive Tag (ARPT) system, which transmits interrogator signals and also receives authentication replies from identification tags 62. The antenna 64 can be mounted either prior to or after the knotter mechanism 58. In one embodiment the bale tying cycle may be initiated by a bale length sensor arrangement such as a rotary encoder 68 or similar device attached a star wheel 70 extending horizontally across and being rotatably mounted to the top of the baling chamber 32, an angular sensor 72 on a slacker arm 74 used to control slack in the binding material 52 supplied to the knotter mechanism 58, and an electronic motor or actuator 76 to engage the knotter mechanism 58. The angular sensor 72 senses the position of the slacker arm 74 to determine the position of the binding material 52 in relation to the knotter mechanism 58. The star wheel 70 wheel may have a toothed periphery which extends into the baling chamber 32 and is contacted by a forming bale 14 so as to be rotated as the bale grows in length. The rotation of the star wheel 70 is sensed and converted into a signal representing bale length, with a control signal being sent to initiate the tying cycle when the forming bale reaches a length corresponding to a desired bale length. As the bale identification assembly 11 detects a given identification tag 62, it can then use a combination of the star wheel 70 and position sensor 72 on the slacker arm 74 to predict the passage of identification tags 62 through the knotter mechanism 58 to alter the length of the bale 14 via an early or late motor trip or to cause an additional flake to be added or the bale 14 to be finished with fewer flakes to prevent the knotter 58 from cycling on the identification tag 62 preventing knotter damage and/or damage to the bale identification tag 62.

In one embodiment, the bale identification tags 62 are incorporated into the binding material 52 in the upper supply roll 56A intended for the top of the bale 14 for easy identification and reduced usage. The top binding material 52 with the bale identification tags 62 will then be combined with the lower binding material 52 from the lower supply roll 56B that lacks the bale identification tags 62 on the machine by the knotter assembly 50.

Desirably, the star wheel 70 is mounted at a known distance from the knotter mechanism 58. The bale identification assembly 11 has a knotter cycle sensor 82, and at least one of the antennas 64 is mounted at a known distance from the star wheel 70. The bale identification assembly 11 has the reader module 66, and a main task controller 86, which may be part of the ECU 48.

In one embodiment, the knotter cycle sensor 82 will define the boundaries of a given bale 14. Then using the known offsets and the star wheel position sensor 80, the start and end points of that bale 14 can be adjusted as they pass by the antenna 64. Thus any identification tags 62 viewed between the start and end point are then assigned to that bale 14 as their identification in the task controller 86. Any attributes such as feed values, drop point, moisture, etc. can then be assigned for that bale 14 in the task controller 86 or similar software.

In one embodiment, the bale identification assembly 11 has a bale drop sensor 88, an RFID antenna 64 mounted on or rearward of the bale chamber 32, the reader module 66, and the task controller 86. As a bale 14 passes over the discharge chute 36, a bale activation device such as a paddle 89 is moved, tripping the bale drop sensor 88. This is turn would activate the antenna 64 until the sensor 88 returns to its original state or until a given time has been reached. During its active cycle, the antenna 64 and reader 66 will assign any identification tag 62 values the reader can sense to the bale 14 that is actively leaving the chamber 32. Any other desired attributes could then be post assigned to the bale 14 in the task controller 86. In the event that a tag 62 was sensed over multiple bale events, the identification tag number would only be assigned to the latest bale drop.

In one embodiment, instead of trying to store the bale attribute data to the bale identification tag 62 itself, the identification tag 62 is assigned to a given bale 14. Other attributes of that bale 14 such as weight, variety, location, moisture, feed value, mass flow, flake count, time of day, etc. can be assigned to the identification element through the software of the task controller 86 post bale drop. This data can then be displayed in multiple ways. Either through a GIS map for future decision making, or as a text file type display. Either would be available to either export or display on other task controller equipped machines such as bale handling and loading equipment to record or display all attributes of bales being fed or sold. When each bale 14 is formed, the controller 86 may assign an identification number to the bale 14. This identification number is unique to all other bales formed. In addition, the identification number assigned to each bale 14 may be different from the identification associated with the one or more bale tags coupled to the bale via the twine. Thus, as the bale is formed and the controller 86 associated an identification number to the bale, the read module 76 reads the one or more identification tag 62 and communicates the tag identification number to the controller 86. Moreover, the sensors 44, 46 may communicate measurements and other data detected to the controller 86. The controller 86 can therefore associate the measurements with the bale identification number and bale tag identification number. Alternatively or in addition, the controller 86 may communicate the measurements from the sensors 44, 46, the bale identification number, and the bale tag identification number (when communicated via the reader module 66) to the data server or database. A data matrix or spreadsheet to store the data in an organized format so that it may be retrieved at a later time. For example, a user of a mobile device may access the data wirelessly via Wi-Fi, cloud-based technology or any other known communication means by accessing a server or database where the information is stored. In this manner, the data associated with any bale 14 may be tracked from a remote location at any given time.

In one embodiment, the bale identification tags 62 incorporated into the tying medium 52 are spaced at a given and specific interval for varying applications on the continuous piece of binding material. Not only does this allow a operator to match the desired element spacing to a given bale length, i.e. a 6 ft. spacing could match 6 ft. bales and could be easily switched to 4 ft. or 8 ft., it also allows for predictive software to determine where the bale identification tags 62 are in relationship to machine components of the knotter system 50 without actively sensing the tag 62 throughout the entire process. This in turn allows for disruption of certain machine elements in order to preserve the bale identification tag 62 as well as a failsafe to ensure that each bale 14 leaves the baler 18 with a bale identification tag 62 attached. In one example, the top twine 52 on an 8 foot bale measures approximately 7 feet, and the spacing of the identification tags 62 are at 6.9 feet so as to create slightly more than 1.0 identification tags 62 per bale 14.

In one embodiment, if multiple bale identification tags 62 are attached to a single bale 14, the same bale ID would be assigned to all bale identification tags 62 that were read for that bale 14 in either a cloud or task controller 86 environment. This could also be done on the baler 18 using the antenna offset and knotter cycle events. In an alternate embodiment, any multiple bale identification tags 62 sensed for a given bale 14 would be neutralized. For example, the antenna 64 would sense the presence of the first bale identification tag 62 associated with a given bale 14 and associate a bale ID to that tag. Any additional bale identification tags 62 that would normally be associated with that bale ID would be neutralized so as to only create a single active bale identification tag 62 per bale 14.

Figure 4:
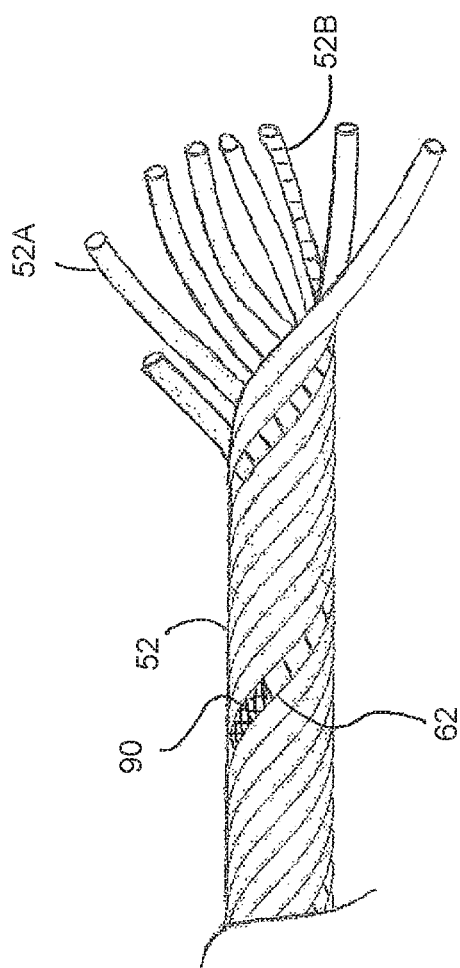
FIG. 4 is a side view of a binding material containing a bale identification tag.

Turning now to FIG. 4, in one embodiment, the placement of the identification tag 62 onto the binding material 52 occurs during twine production. The binding material 52 comprises multiple filaments or strands of non-identifying filaments 52A and at least one non-similar identifying filament 52B incorporating the identification tag 62 into the individual identifying filament. In one common prior art process, the material that makes up the binding material 52 is extruded as a single sheet before being cut into individual filaments and then wound into a finished twine product. In one embodiment, during the extrusion process, the identifying filament 52B has an RFID inlay 90 inserted before the filament is wound. The RFID inlay 90 desirably comprises conducting wires of an antenna connected to a RAIN RFID chip. The length of the RFID inlay 90 is desirably between about 10 and 24 cm. Thus, the RFID inlay 90 is a segment of the identifying filament 52B with the RFID inlays 90 spaced along the identifying filament 52B at a desired interval. The identifying strand 52B incorporating the RFID inlay 90 is incorporated into the last stages of the twine production process to be wound with other individual twine filaments 52A that do not contain an RFID inlay into a single twine strand 52 with both the twine filaments 52B and the non-similar identifying filament 52A.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A bale identification assembly for use with an agricultural baler used to take loose crop material from the ground and compress the loose crop material to form a bale in a baling chamber with a reciprocating plunger, the baler having at least one crop sensor configured to sense a parameter of the crop material or at least one bale sensor configured to sense a parameter of the formed bale, a knotter system comprising a knotter mechanism for securing a binding material to bind the formed bale and tie a knot in the binding material, and a discharge chute at the rear end of the baling chamber through which a completed bale is discharged, the bale identification assembly comprising:

a binding material used by the knotter system to bind the formed bale, the binding material comprising identification tags at spaced intervals along the binding material;

a read module with one or more antennas configured to transmit interrogator signals and also receives authentication replies from the identification tags;

a position sensor configured to predict the passage of the identification tags through the knotter mechanism;

a bale length sensor providing a signal representing bale length, with a control signal being sent to initiate a tying cycle when the formed bale reaches a length corresponding to a desired bale length; and a controller configured to receive signals from the bale length sensor and the position sensor and to generate a signal to alter the length of the bale by causing an additional flake to be added to the bale by the plunger or the bale to be finished with fewer flakes to prevent the knotter system from tying a knot in the binding material such that the identification tag is positioned in a portion of the binding material used to form the knot.

2. The bale identification assembly of claim 1 wherein knotter system comprises a first supply roll of binding material having identification tags and a second supply roll with binding material without identification tags, wherein the knotter system combines the binding material from the first supply roll with the binding material from the second supply roll to bind the formed bale.

3. The bale identification assembly of claim 1 wherein the bale length sensor comprises a star wheel that contacts a forming bale so as to be rotated as the bale grows in length.

4. The bale identification assembly of claim 1 further comprising a knotter cycle sensor configured to define boundaries of a bale associated with the tying of knots by the knotter system for the completed bale, wherein the controller uses inputs from the bale length sensor and the knotter cycle sensor to determine start and end points for the completed bale, and wherein identification tags recognized by the read module between the start and end point and parameters sensed by the at least one crop sensor and/or bale sensor are assigned to the completed bale.

5. The bale identification assembly of claim 1 wherein the binding material comprises at least one strand of a non-identifying filament and one strand of an identifying filament incorporating the identification tag, wherein the non-identifying filament and the identifying filament are wound together before the binding material is used to bind the bale of crop material.

6. The bale identification assembly of claim 5 wherein the identifying filament comprises an radio-frequency identification (RFID) inlay, wherein the RFID inlay comprises conducting wires of an antenna connected to an RFID chip, and the RFID inlay comprises a segment of the identifying filament with adjacent RFID inlays spaced along the identifying filament at a desired interval, and the identifying filament incorporating the RFID inlay is wound during a binding material production process with at least one non-identifying filament into a single twine strand.

\* \* \* \* \*